United States Patent [19]

Stawski, II

[11] Patent Number: 5,573,404
[45] Date of Patent: Nov. 12, 1996

[54] DEVICE AND PROCESS FOR MODIFYING BEHAVIOR OF CHILDREN

[76] Inventor: Willard S. Stawski, II, 796 Eastridge Dr. NE., Grand Rapids, Mich. 49546

[21] Appl. No.: 189,920

[22] Filed: Feb. 1, 1994

[51] Int. Cl.⁶ .................................................. G09B 19/00
[52] U.S. Cl. ............................................................ 434/238
[58] Field of Search ................................... 434/238, 237, 434/236, 109, 108, 107, 416, 415, 421, 430, 110; 40/107, 109, 110; 283/115, 2

[56] References Cited

U.S. PATENT DOCUMENTS

| | | | |
|---|---|---|---|
| 1,419,809 | 6/1922 | Bowles, Jr. | 434/107 X |
| 1,479,979 | 1/1924 | Boughton | 283/115 |
| 2,883,765 | 4/1959 | Blaine | 434/238 |
| 4,384,855 | 5/1983 | Walsh | 434/238 |
| 4,639,226 | 1/1987 | Rahn et al. | 283/115 X |
| 5,102,169 | 4/1992 | Mayfield | 283/115 |

*Primary Examiner*—Gene Mancene
*Assistant Examiner*—Jeffrey A. Smith
*Attorney, Agent, or Firm*—Waters & Morse, P.C.

[57] ABSTRACT

A behavior modification device and process comprises a recording implement having a group of interrelated columnar items of a person's behavior, with an assigned monetary value to each of these. The columns are laterally and vertically aligned so that the person has a running view of a summary of the effect of his behavior during a stated period. The device is constructed as a sheet of printable paper or plastic material secured in place by magnetic attachment to a refrigerator door, or to some similar available surface where the family traffic is relatively dense. The device, when completed for the stated period, can be used as a basis for the payment of allowances.

9 Claims, 1 Drawing Sheet

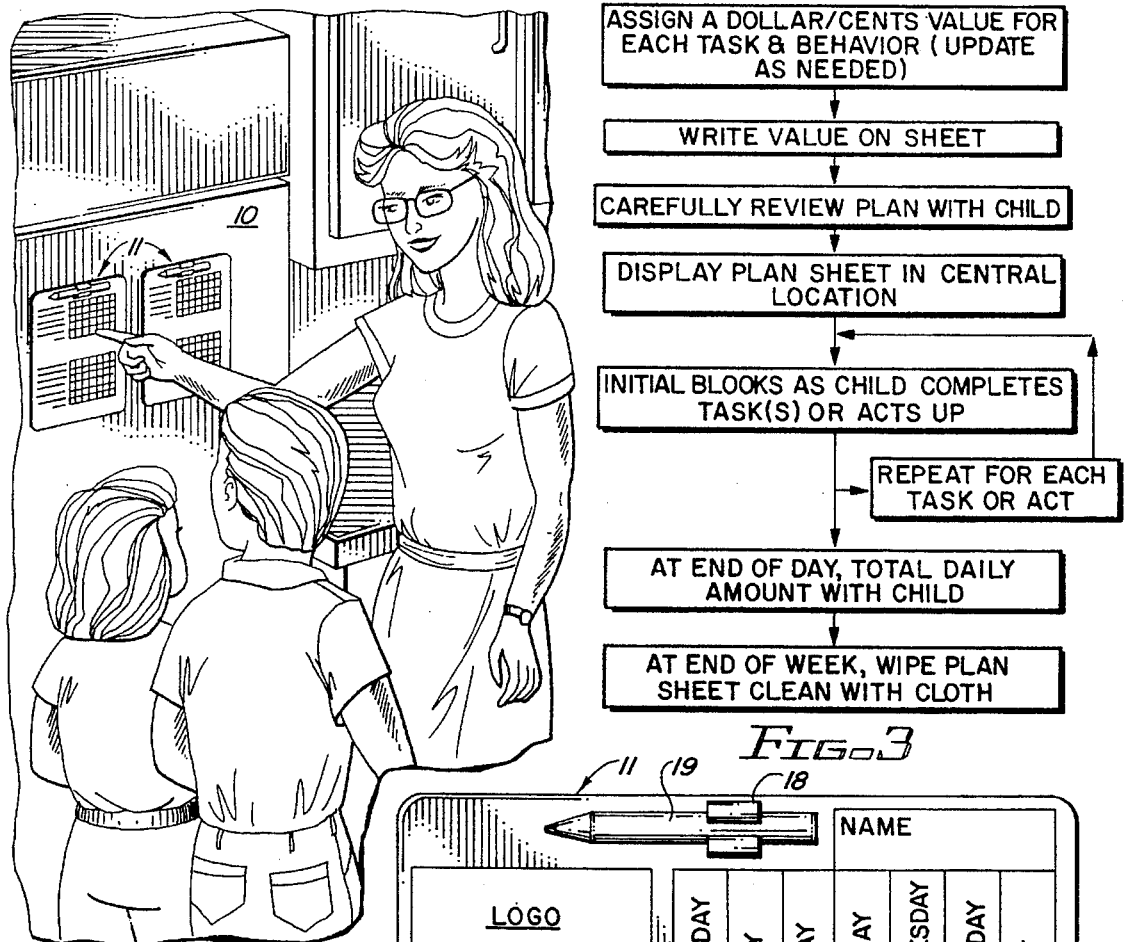
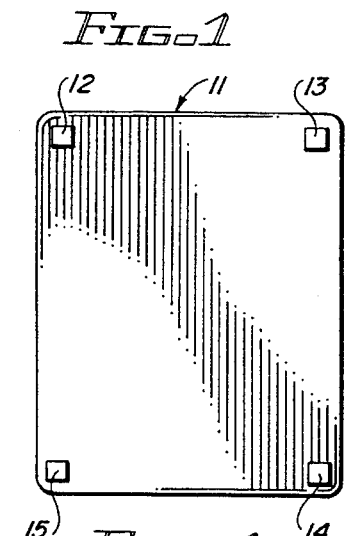

DEVICE AND PROCESS FOR MODIFYING BEHAVIOR OF CHILDREN

RELATED FIELD

This invention relates to devices and processes used for influencing the behavior of children by a reward-penalty prearrangement.

BACKGROUND OF THE INVENTION

The establishment of appropriate patterns of behavior in children is crucial in social development. The parent is confronted with the ongoing question of why a child should do what is expected of him or her, rather than what he or she feels like doing. Whether spoken or unspoken, the child's attitude is often determined by the related question: "What's in it for me?" One parental response to this has been the liberal application of physical punishment or the withdrawal of privileges. As any parent knows, this policy has not always been successful.

Studies in behavior modification have suggested that rewards and punishment, when clearly defined in advance, can keep a child aware of the advisability of doing what is expected. There is then a tendency to take away the element of personal domination by the parent, which is offensive to the child's ego. The program can take on an air of objectivity that can decrease the intensity of the state of conflict common in most households.

SUMMARY OF THE INVENTION

This invention provides a device and process that keeps a child continually aware of the consequences of what he or she is doing, and without the personal nagging usually necessary to accomplish this. Removal of the nagging factor makes it possible for the child to weigh the effect of what he does on a rational basis, rather than reacting with an irritated response to compulsion.

The device has the effect of establishing agreed values to particular actions-positive for good ones, and negative for bad ones. These are listed in columnar alignment for each day of the week, so that the child has a running view of the net effect of a day's behavior. The day totals are best summed up for the week, and this result can be used as a basis for the payment of an allowance. Since all of this has been agreed upon in advance, the parent becomes an interested spectator, rather than a tyrant.

The process and apparatus of the present invention also can be used for behavior modification programs for persons other than children. Use in workplace environments and prisons are two exemplary uses.

DESCRIPTION OF THE DRAWINGS

FIG. 1 is a perspective view showing a young mother accompanied by her two children, all standing in front of a refrigerator on which the devices of this invention have been posted.

FIG. 2 is a plan view showing the device, and the arrangement of the various items.

FIG. 3 is a block diagram showing the procedure to be used in the preparation of the device for a particular family situation.

FIG. 4 is a view of the reverse side of the device from that shown in FIG. 2.

DESCRIPTION OF THE PREFERRED EMBODIMENT

Referring to FIG. 1, a mother and her two children are shown standing in front of the refrigerator 10 on which the training devices 11 for each child have been posted. These are recording implements which have previously been prepared as suggested in FIG. 3, and are preferably held in place on the refrigerator door by small magnets mounted at the corners of the back of the devices, as shown in FIG. 4. The magnets are indicated at 12–15. Thin magnets having pressure sensitive adhesive on one side can be affixed to the corners of the device. Suction cups 20 (FIG. 2) can be used for non-metallic surfaces.

Referring to FIG. 2, the face of the device contains a group of interrelated columns of items that have the net effect of keeping a child aware of the behavior that has been attributed to him or her over a period of a full week. Positive actions, in which the child has taken care of stated responsibilities are listed in separate rows in column 16. A dollar value is assigned to each specific task and the list is reviewed carefully with the child. Laterally opposite these items (to the right, as shown in FIG. 2) is a series of columns for separate time periods, preferably each day of the week, with a place for the insertion of the value that has been assigned, if the task has been completed. Directly below the column 16 is a second column 17, which defines negative values to particular items of behavior. Laterally opposite the column 17 items is a place for each day of the week for the insertion of appropriate amounts that have been determined by the child's behavior. These latter day columns are in direct columnar alignment with the corresponding day columns associated with column 16. It is preferable to provide a daily total that sums up the net effect of the positive and negative items. The weekly sum of the "daily totals" can then be used as the basis for the payment of allowances. The device should be left continually posted on the refrigerator during the period in which it is used, as common experience verifies that the refrigerator is probably the one place in the household that gets the most continuous "traffic". Other high traffic locations would be suitable. A small clip 18 secured to the device 11 can be used for retaining a pencil 19 in readiness at all times. The device is formed of a printable flexible sheet material that preferably is somewhat stiff. A preferred material is paper that has been imprinted with the chart information and thereafter laminated with a plastic (synthetic resin) of a type that can tolerate being wiped off with a damp cloth or otherwise erased if marked with a compatible marking instrument. The lamination adds stiffness as well as erasability. As an alternative, the device can be formed of a sheet or board of synthetic resin. Also, if a permanent record is desired, the recording implement can be provided in the form of a medium such as unlaminated or plain paper and a separate sheet can be provided and displayed for each week. A non-erasable marker such as a pen is employed to provide a permanent record.

In operation, the device is used in a behavior modification process for children in the manner set forth in FIG. 3. The visible display of listings of desirable and undesirable behavior and the continual recording and display of the monetary effects thereof provides constant reinforcement and continuous reminders of desirable behavior patterns and the net results thereof. Other rewards and penalties can be used when the device is used for persons other than children.

I claim:

1. A device for modifying the behavior of children, said device comprising a chart including:

a task column listing of tasks representing responsibilities of a child;

a day column for each day of the week containing data entry locations for recording designations of a predetermined value of each of said tasks, said locations being laterally opposite from said tasks, respectively;

a behavior column listing reprehensible behavior of the child;

a day column for each day of the week containing data entry locations for recording designations of a predetermined negative value of each of said behaviors, said latter locations being laterally opposite from said behaviors, respectively, and in vertical alignment with said task day columns for each day;

a net data entry location for each day aligned with the task and behavior columns for the day, the net data entry locations being used for recording a net value representative of a sum of the positive and negative designations entered in the task and behavior columns for each day of the week, the net designations for for each day of the week balancing said task and behavior values, offsetting one against the other.

2. A device as defined in claim 1, additionally including a daily net designation in columnar alignment with said day columns.

3. A device as defined in claim 2, additionally including a net balance between said task and behavior items for a full week.

4. A process for modifying the behavior of a child comprising the steps of:

displaying on a visible record keeping implement a list identifying positive behavior and negative behavior;

specifying on the record keeping implement specific monetary rewards or penalties for each behavior;

reviewing with the child the positive and negative behavior and the specific rewards and penalties for each;

recording when the child earns rewards and penalties for the respective behaviors for each day on the implement;

providing spaces on the implement for recording the net rewards and penalties earned for each day of the week;

recording on the implement with a marker the net reward or penalty for each day of the week for a week;

paying or extracting from the child the net reward or punishment for the week; and repeating the process weekly until the behavior is modified permanently.

5. A process according to claim 4 wherein the recording implement includes separate lists for positive and negative behavior, with each behavior attribute occupying one behavior row and the rows being arranged in a vertical behavior column, the implement including separate day columns for the respective days of the week positioned adjacent the behavior column, the intersections of the behavior rows and day columns comprising defined spaces for recording a specific reward or penalty for the exhibition of each behavior attribute for each day, the day columns including spaces at an end of the column for recording the net total of rewards and penalties for each day, so the child can see the net monetary effect of his or her behavior each day.

6. A process according to claim 4 wherein the recording implement is an erasable marking board that includes magnets on a back side thereof and is attached for continuous display to a refrigerator door or the like.

7. A process according to claim 4 wherein the marker is erasable and the recording implement comprises an exterior surface formed of a synthetic resin from which the marker can be erased.

8. A process according to claim 7 wherein the recording implement comprises a printed paper sheet laminated with a plastic coating and the marker can be wiped off with a damp cloth.

9. Behavior modifying means for modifying the behavior of a child by determining a periodic allowance for the child based on the behavior of the child during an allowance period, said means comprising a visual display chart including:

a behavior listing setting forth a list of behavior elements on which the allowance is to be calculated, together with an assigned positive or negative value for each behavior;

a data listing for each period of time representative of an allowance period, the data listing including a blank data display location adjacent each of the behavior elements in the behavior listing display, the data listing being adapted to display recorded indications representative of the value attributed to the exhibition of individual behavior elements during the allowance period; and means for displaying a net amount representative of the sum of positive and negative values attributed to the recorded behavior of the child during the allowance period.

* * * * *